United States Patent
Prakash et al.

(10) Patent No.: US 9,584,290 B2
(45) Date of Patent: Feb. 28, 2017

(54) MULTIPLE CARRIER ACTIVATION/DEACTIVATION IN WIRELESS COMMUNICATIONS

(75) Inventors: Rajat Prakash, La Jolla, CA (US); Jelena M. Damnjanovic, Del Mar, CA (US); Peter Gaal, San Diego, CA (US); Parag Arun Agashe, San Diego, CA (US); Valentin Alexandru Gheorghiu, Toyko (JP); Masato Kitazoe, Tokyo (JP); Ravi Palanki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1486 days.

(21) Appl. No.: 12/953,356

(22) Filed: Nov. 23, 2010

(65) Prior Publication Data

US 2011/0292915 A1 Dec. 1, 2011

Related U.S. Application Data

(60) Provisional application No. 61/267,768, filed on Dec. 8, 2009, provisional application No. 61/322,621, filed on Apr. 9, 2010.

(51) Int. Cl.
*H04W 72/04* (2009.01)
*H04L 5/00* (2006.01)
(Continued)

(52) U.S. Cl.
CPC .......... *H04L 5/0064* (2013.01); *H04L 5/0087* (2013.01); *H04L 5/0098* (2013.01);
(Continued)

(58) Field of Classification Search
CPC . H04W 72/02; H04W 72/04; H04W 72/0406; H04W 72/0446; H04W 72/0453;
(Continued)

(56) References Cited

U.S. PATENT DOCUMENTS 6,434,183 B1 * 8/2002 Kockmann et al. .......... 375/132
7,577,118 B2 * 8/2009 Haumonte et al. .......... 370/330
(Continued)

FOREIGN PATENT DOCUMENTS

CN 1496633 A 5/2004
CN 101371475 A 2/2009
(Continued)

OTHER PUBLICATIONS

Catt: "Carrier activation and de-activation", 3GPP Draft; R2-096502, 3rd Generation Partnership Project (3GPP), Mobile Competence Centre ; 650, Route Des Lucioles ; F-06921 Sophia-Antipolis Cedex ; France, Nov. 9, 2009 (Nov. 9, 2009), XP050391089, [retrieved on Nov. 3, 2009].
(Continued)

*Primary Examiner* — Hoang-Chuong Vu

(57) ABSTRACT

Systems, methods and apparatuses are provided that facilitate selecting resources, such as time slots, subframes, etc., for performing bandwidth switching related to activating and/or deactivating one or more carriers. A data portion of one or more subframes can be selected for performing bandwidth switching. In addition, a device can determine whether one or more downlink grants are received in the one or more subframes, and can avoid selecting such subframes. The device can alternatively perform the bandwidth switching and request retransmission of the data portion. Additionally or alternatively, the device can determine a type of the one or more subframes and/or signals transmitted in the one or more subframes to determine whether to perform bandwidth switching in the subframes. The bandwidth switching can include changing a sampling rate, reconfiguring frequency filters, modifying a local oscillator, etc.

51 Claims, 10 Drawing Sheets

(51) Int. Cl.
*H04W 72/00* (2009.01)
*H04W 72/02* (2009.01)

(52) U.S. Cl.
CPC .......... *H04L 5/0023* (2013.01); *H04L 5/0037* (2013.01); *H04W 72/00* (2013.01); *H04W 72/02* (2013.01)

(58) Field of Classification Search
CPC .... H04W 72/00; H04L 5/0098; H04L 5/0064; H04L 5/0087; H04L 5/0023; H04L 5/0037
USPC .............. 370/252, 322, 329, 335, 336, 337; 455/450, 509, 515, 522
See application file for complete search history.

(56) References Cited

U.S. PATENT DOCUMENTS

| | | | |
|---|---|---|---|
| 8,711,785 B2* | 4/2014 | Gholmieh | H04L 5/0053 370/329 |
| 9,320,039 B2* | 4/2016 | Gerstenberger | H04W 72/0453 |
| 2002/0093975 A1* | 7/2002 | Lin et al. | 370/442 |
| 2007/0070908 A1 | 3/2007 | Ghosh et al. | |
| 2007/0223611 A1 | 9/2007 | Ode et al. | |
| 2009/0003477 A1 | 1/2009 | Nishio et al. | |
| 2009/0092091 A1 | 4/2009 | Balasubramanian | |
| 2009/0279480 A1* | 11/2009 | Rosenqvist et al. | 370/328 |
| 2010/0118720 A1* | 5/2010 | Gauvreau et al. | 370/252 |
| 2010/0130219 A1* | 5/2010 | Cave et al. | 455/450 |
| 2010/0240406 A1* | 9/2010 | Tseng | 455/509 |
| 2010/0265905 A1* | 10/2010 | Lee et al. | 370/329 |
| 2010/0296467 A1* | 11/2010 | Pelletier et al. | 370/329 |
| 2011/0039593 A1* | 2/2011 | Lee et al. | 455/515 |
| 2011/0080962 A1* | 4/2011 | Blankenship et al. | 375/259 |
| 2011/0103323 A1* | 5/2011 | Wang et al. | 370/329 |
| 2011/0111785 A1* | 5/2011 | Lindoff et al. | 455/513 |
| 2011/0222555 A1* | 9/2011 | Sugita | 370/458 |
| 2012/0057490 A1* | 3/2012 | Park et al. | 370/252 |
| 2012/0099464 A1* | 4/2012 | Chun et al. | 370/252 |

FOREIGN PATENT DOCUMENTS

| | | |
|---|---|---|
| KR | 20070058683 A | 6/2007 |
| WO | WO2005112566 A2 | 12/2005 |
| WO | WO-2006046307 A1 | 5/2006 |
| WO | WO-2007080892 A1 | 7/2007 |

OTHER PUBLICATIONS

Ericsson, et al., "Activation and deactivation of component carriers", 3GPP Draft; R2-096752 Activation and Deactivation of Component Carriers, 3rd Generation Partnership Project (3GPP), Mobile Competence Centre ; 650, Route Des Lucioles ; F-06921 Sophia-Antipolis Cedex ; France, no. Jeju; Nov. 9, 2009, Oct. 9, 2009 (Oct. 9, 2009), XP050391223, [retrieved on Nov. 3, 2009].

International Search Report and Written Opinion—PCT/US2010/059328—ISA/EPO—Apr. 26, 2011.

NEC: "Component carrier configuration/activation for carrier aggregation", 3GPP Draft; R2-095576, 3rd Generation Partnership Project (3GPP), Mobile Competence Centre ; 650, Route Des Lucioles ; F-06921 Sophia-Antipolis Cedex ; France, No. Miyazaki; Oct. 12, 2009, Oct. 12, 2009 (Oct. 12, 2009), XP050390111, [retrieved on Oct. 6, 2009].

\* cited by examiner

MULTIPLE CARRIER ACTIVATION/DEACTIVATION IN WIRELESS COMMUNICATIONS

CLAIM OF PRIORITY UNDER 35 U.S.C. §119

The present Application for Patent claims priority to Provisional Application No. 61/267,768 entitled "ENHANCEMENTS TO ACTIVATION-DEACTIVATION OF CONFIGURED CARRIERS," filed Dec. 8, 2009, and assigned to the assignee hereof and hereby expressly incorporated by reference herein, as well as Provisional Application No. 61/322,621 entitled "MINIMIZING RADIO FREQUENCY RETUNING/RECONFIGURATION IMPACT," filed Apr. 9, 2010, and assigned to the assignee hereof and hereby expressly incorporated by reference herein.

BACKGROUND

Field

The following description relates generally to wireless communications, and more particularly to configuring multiple carriers for one or more devices.

Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, ... ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more embodiments and the corresponding disclosure thereof, various aspects are described in connection with minimizing service disruption resulting from activating/deactivating one or more configured carriers. In one example, a device can select resources during which to activate/deactivate carriers to have a minimal effect on communications. Thus, the device can determine one or more aspects of the resources and can select resources that conform to one or more criteria. The device can then perform bandwidth switching over the resources, which can include changing a sampling rate, filtering frequencies, modifying a local oscillator of the device, and/or the like.

According to an example, a method of wireless communication is provided that includes determining modification of an activation state of one or more carriers and selecting a portion of one or more time slots for performing bandwidth switching based at least in part on the determining the modification. The method further includes performing bandwidth switching during the portion of the one or more time slots.

In another aspect, a wireless communications apparatus for activating or deactivating configured carriers in wireless communications is provided that includes at least one processor configured to detect modification of an activation state of one or more carriers and select a portion of one or more time slots for performing bandwidth switching based at least in part on the modification of the activation state. The at least one processor is further configured to switch bandwidth during the portion of the one or more time slots. In addition, the wireless communications apparatus includes a memory coupled to the at least one processor.

In yet another aspect, an apparatus for activating or deactivating configured carriers is provided that includes means for determining modification of an activation state of one or more carriers. The apparatus further includes means for selecting a portion of one or more time slots for performing bandwidth switching based at least in part on the determining the modification and means for performing bandwidth switching during the portion of the one or more time slots.

Still, in another aspect, a computer-program product is provided for activating or deactivating configured carriers in wireless communications including a computer-readable medium having code for causing at least one computer to detect modification of an activation state of one or more carriers. The computer-readable medium further includes code for causing the at least one computer to select a portion of one or more time slots for performing bandwidth switching based at least in part on the modification of the activation state and code for causing the at least one computer to switch bandwidth during the portion of the one or more time slots.

Moreover, in an aspect, an apparatus for activating or deactivating configured carriers is provided that includes a carrier modification receiving component for determining modification of an activation state of one or more carriers and a resource selecting component for selecting a portion of one or more time slots for performing bandwidth switching based at least in part on the determining the modification. The apparatus further includes a bandwidth switching component for performing bandwidth switching during the portion of the one or more time slots.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
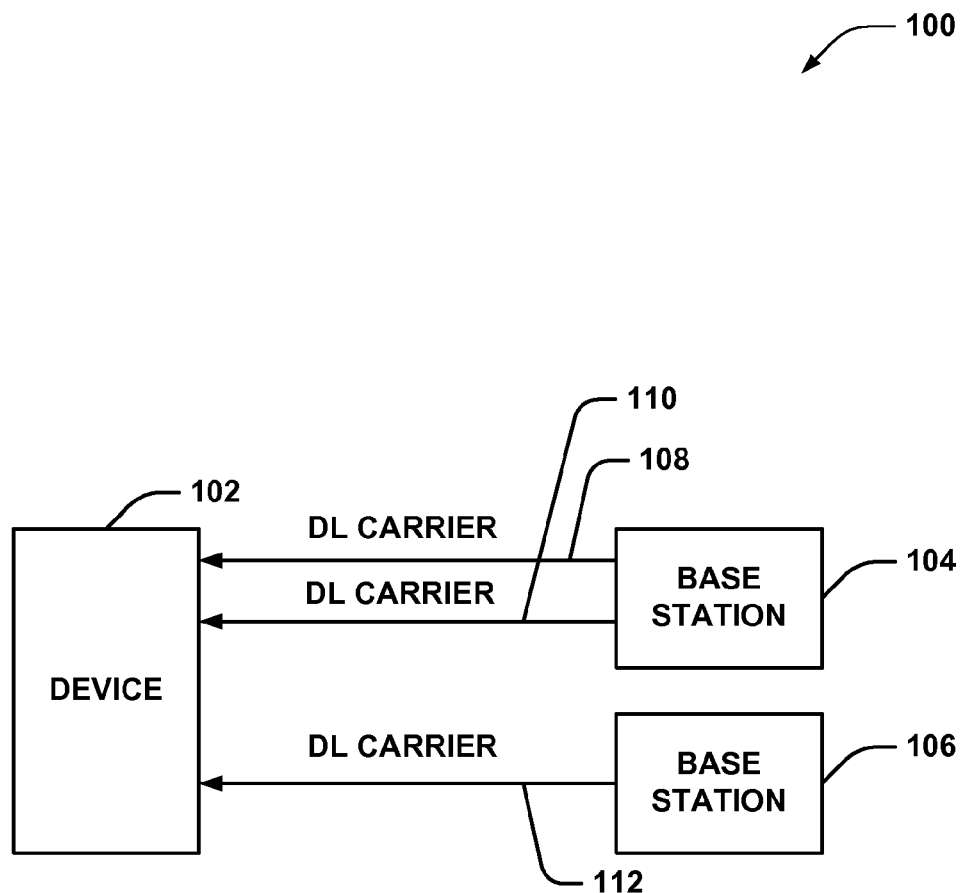
FIG. 1 illustrates an example system for communicating over a plurality of carriers in a wireless network.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described further herein, a device can perform bandwidth switching related to carrier activation/deactivation to minimize impact on communications with one or more base stations. For example, the device can select resources (e.g., time slots, subframes, frequencies, etc.) over which to perform the bandwidth switching. In one example, the device can select a portion of one or more subframes reserved for data communications, such that the bandwidth switching can have minimal to no impact on control data in the one or more subframes and/or adjacent subframes. The one or more subframes can be selected, for example, based on the device determining that there are no, or a least number of, data transmissions in the one or more subframes. In other examples, the device can determine a type of subframe and/or a type of one or more signals transmitted in a subframe to determine whether to perform bandwidth switching in the subframe.

Furthermore, for example, where the device determines to switch bandwidths in a data portion of a subframe with assigned resources, the device can subsequently request retransmission of at least a part of the data portion not received due to the bandwidth switching. Moreover, the device can receive or otherwise determine a number of subframes allowed for performing bandwidth switching. Additionally, the bandwidth switching can relate to at least one of changing a sampling rate, reconfiguring one or more filters, modifying a local oscillator frequency, and/or the like. In yet another example, the base station can refrain from assigning data resources to the device for one or more subframes following sending a carrier activation/deactivation command, such that the device can perform the bandwidth switching within the one or more subframes to minimize data loss.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, illustrated is a wireless communication system 100 that facilitates managing multiple carriers. System 100 includes a device 102 that can communicate with one or more base stations, such as base stations 104 and 106, over one or more carriers, such as downlink carriers 108, 110, and/or 112. For example, device 102 can be a UE, modem (or other tethered device), a portion thereof, or substantially any device that can communicate to one or more base stations or other devices in a wireless network over one or more carriers. In addition, base stations 104 and 106 can each be, for example, a macrocell, femtocell, picocell, or similar base station, relay node, mobile base station, UE (e.g., communicating in peer-to-peer or ad-hoc mode with device 102), a portion thereof, and/or substantially any device that provides one or more disparate devices with access to a wireless network over one or more carriers.

According to an example, base station 104 and/or 106 can configure one or more carriers for communicating with device 102. As depicted, base station 104 can at least configure downlink carriers 108 and 110 for communicating with device 102, and base station 106 can at least configure downlink carrier 112. In an example, one or more of the downlink carriers 108, 110, and 112 can be activated at a given point in time for communicating with device 102. For example, the downlink carriers 108, 110, and/or 112 can be activated or deactivated based at least in part on one or more of bandwidth requirements at device 102, location of device 102 relative to base stations 104 and/or 106, signal quality related to the downlink carriers 108, 110, and/or 112 at device 102, and/or the like. In this example, device 102 can receive a modification of an activation state (e.g., such as a command to modify an activation state) of the one or more carriers from base station 104. In an example, device 102 can switch bandwidths to facilitate activating and/or deactivating one or more carriers, such as downlink carriers 108, 110, and 112, which can cause disruption in communication over a set of currently active carriers.

In one example, where downlink carrier 110 is configured but not activated, base station 104 can activate downlink carrier 110 (e.g., to allow increased data rate for communicating with device 102). Activating the downlink carrier 110 can include instructing device 102 to activate the carrier and sending signals thereover. To activate the carrier, device 102 can modify an activation state thereof and switch bandwidths to include/exclude the carrier 110, which can comprise at least one of changing a sampling rate, reconfiguring filters to filter in/out some frequencies, modifying or retuning a local oscillator to receive additional frequencies related to the downlink carrier 110, and/or the like. In this regard, for example, switching bandwidth can result in processing time at device 102, during which communications from one or more base stations, such as base station 104 or 106 over carriers 108 or 112, can be lost. In this regard, for example, device 102 can select resources for switching bandwidths to minimize impact on communications from base stations 104 or 106 upon determining modification of the activation state of the carrier.

For example, device 102 can select one or more time slots, or portions thereof, for switching bandwidth. For example, the one or more time slots can relate to a time slot during which device 102 can switch on a receiver in time division duplexed (TDD) communications, a subframe in orthogonal frequency division multiplexed (OFDM) communications, and/or the like. For example, a subframe can include a portion of a communication frame comprising a frequency band over a period of time, and/or the like. A subframe, for example, can include a number of orthogonal frequency division multiplexed (OFDM) symbols, in one example, where a portion of the number of OFDM symbols are reserved for transmitting control data (e.g., the first n symbols where n is a positive integer—e.g., between zero and three in LTE). In this example, device 102 can select a portion of one or more subframes that is not in a control data portion so as to not interrupt control data transmissions from base station 104 and/or 106 when switching bandwidths.

In one example, the one or more subframes selected can correspond to one or more subframes following activation/deactivation of a carrier within which device 102 does not receive any downlink grants from base station 104 (e.g., and/or base station 106). Thus, in an example, device 102 can evaluate a number of subframes (or subframes for a period of time, such as a number of milliseconds) following activation and/or deactivation of a carrier to determine whether to switch bandwidth in one or more of the number of subframes, where the number of subframes (or the number of milliseconds) can be received from base station 104 or 106, or based on a configuration, or based on a network standard, or based on hardcoding, and/or the like. In addition, a number of subframes during which the bandwidth switching can occur can also be received by device 102 from base station 104 or 106, in a configuration, a network standard, hardcoding, and/or the like.

In other examples, described further herein, device 102 can select subframes for switching bandwidths according to at least one of a type of a subframe, or a type of signals transmitted in the subframes, etc. In addition, device 102 can request retransmission of data sent over resources selected for bandwidth switching, where the resources do include a downlink grant.

Moreover, although shown and described with respect to downlink carriers, aspects described herein can additionally or alternatively be utilized to activate/deactivate uplink carriers. For example, device 102 can determine to perform bandwidth switching in one or more subframes in which it does not transmit control data to base station 104.

Figure 2:
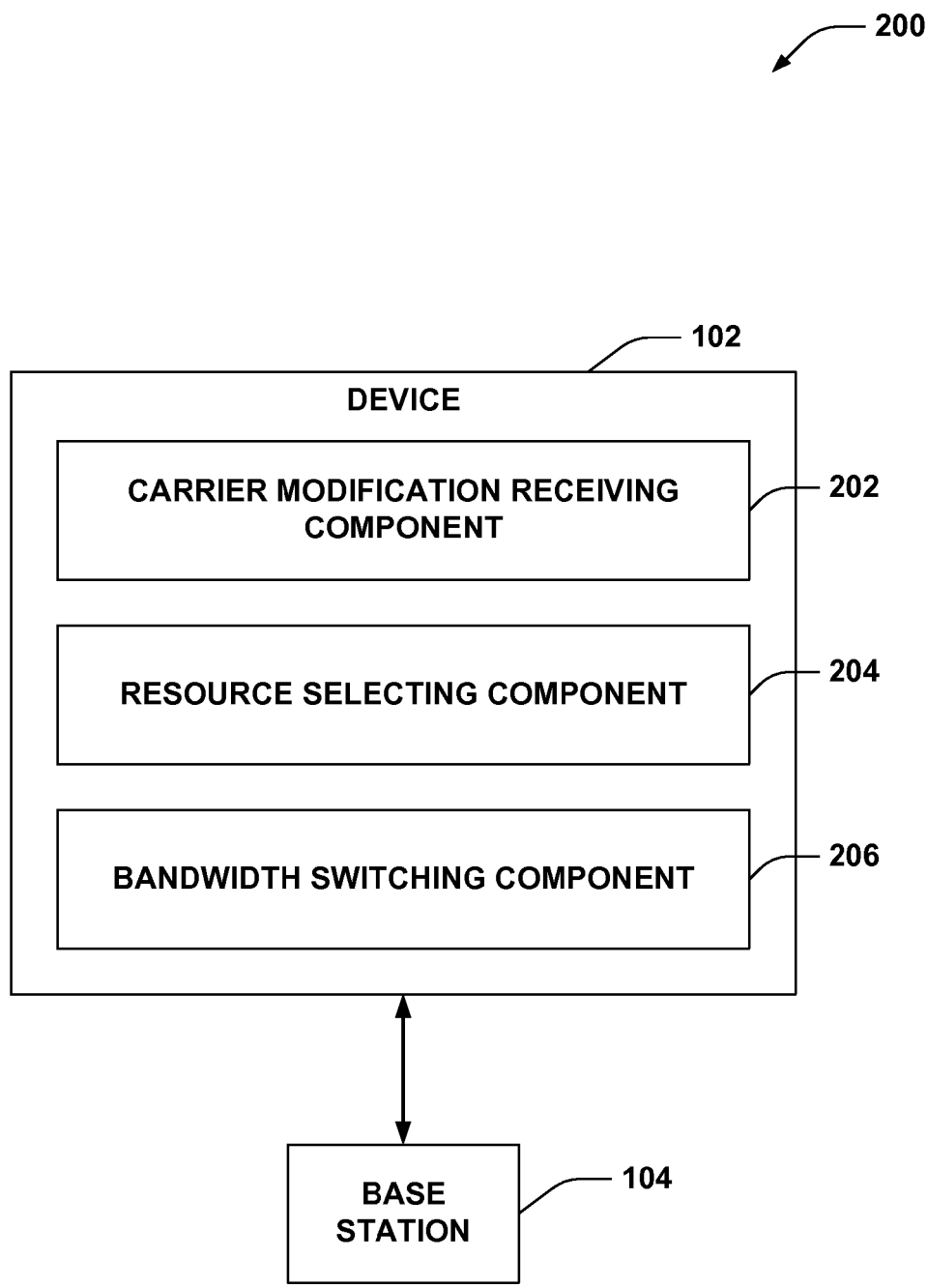
FIG. 2 illustrates an example system for performing bandwidth switching over one or more selected resources.

Turning to FIG. 2, illustrated is an example wireless communications system 200 that facilitates selecting resources for performing bandwidth switching related to activating and/or deactivating carriers. System 200 comprises a device 102, which, as previously described, can communicate with a base station 104 (and/or one or more additional base stations) over a plurality of carriers to receive access to a wireless network. In this regard, for example, base station 104 can be a serving base station 104 of device 102. Device 102 can comprise a carrier modification receiving component 202 that can obtain an instruction or notification to modify an activation state of a carrier (e.g., to activate and/or deactivate the a carrier), a resource selecting component 204 that can determine one or more resources during which to switch bandwidth related to the carrier activation/deactivation, and a bandwidth switching component 206 that performs the bandwidth switching.

According to an example, carrier modification receiving component 202 can obtain an indication of modification of a carrier activation state (e.g., from base station 104, from one or more components of device 102 not depicted, and/or the like). As described, the modification can cause device 102 to change a monitored bandwidth to account for an activated or deactivated carrier. In this regard, resource selecting component 204 can determine resources over which to switch the bandwidth to minimize impact on communications with base station 104 and/or one or more other base stations. In one example, resource selecting component 204 can determine a number of consecutive subframes for performing bandwidth switching based at least in part on a hardcoding, system specification, device configuration, etc.

In one example, resource selecting component 204 can determine to perform bandwidth switching in a data portion of one or more subframes following the carrier modification, so as not to disrupt control data communications. For example, base station 104 can utilize a retransmission technology, such as hybrid automatic repeat/request (HARQ), and/or the like, to communicate over a data portion of the one or more subframes. In this regard, where resource selecting component 204 determines to switch bandwidth over the data portion of the one or more subframes (and bandwidth switching component 206 performs the bandwidth switching over the data portion) even where device 102 does not receive a transmission in the data portion due to the bandwidth switching, it can communicate a non-acknowledgement (NAK) to base station 104 to facilitate retransmission of the missed data. Similarly, in an example, device 102 can buffer control data symbols sent in a subframe by base station 104 (e.g., the first n symbols of the subframe, where n is a positive integer), and resource selecting component 204 can determine whether the data portion comprises a downlink grant from base station 104 based at least in part on the buffered control data symbols. If so, device 102 can request retransmission, as described. In another example, resource selecting component 204 can determine whether the data portion comprises a downlink or uplink grant based at least in part on the control data, and can await a subframe that does not include a downlink or uplink grant for performing bandwidth switching, as described, so that downlink data, uplink transmit opportunities, etc. are not lost.

In another example, resource selecting component 204 can determine one or more other aspects of a subframe to decide whether bandwidth switching component 206 can perform bandwidth switching in the subframe. For example, resource selecting component 204 can detect whether a subframe following the carrier modification determination is a multimedia broadcast over single frequency network (MBSFN) subframe (e.g., based on an indicator in the subframe or otherwise), in which case bandwidth switching component 206 can perform bandwidth switching during the subframe when it is unrelated to a service requested by device 102. In addition, for example, resource selecting component 204 can determine whether a synchronization signal (e.g., primary synchronization signal (PSS), secondary synchronization signal (SSS), etc.), system information blocks (SIB), and/or the like, are to be transmitted over the subframe. If so, resource selecting component 204 can avoid the subframe for performing bandwidth switching.

In addition, for example, resource selecting component 204 can determine resources over which other information is sent in the data portion of one or more subframes, such as a timing advance (TA), and can avoid bandwidth switching over such portions of the one or more subframes. In one example, resource selecting component 204 can select an adjacent subframe subsequent to the subframe over which a TA is sent, since it is unlikely that the adjacent subframe will have additional TA information. In any case, bandwidth switching component 206 can modify the bandwidth in response to operation of resource selecting component 204, where the bandwidth modification can be based at least in part on changing a sampling rate, reconfiguring frequency filters, changing a local oscillator frequency, and/or the like.

In yet another example, where device 102 operates in a TDD mode, resource selecting component 204 can determine to switch bandwidths during a time slot related to powering on a receiver to receive signals from base station 104. For example, resource selecting component 204 can determine the time slot based at least in part on receiving information regarding the time slot from base station 104 in a previous receive time period (e.g., the base station 104 can communicate transmit and receive time slot indications, durations for transmitting and/or receiving, and/or related information to the device 102). In this regard, bandwidth switching component 206 can configure device 102 before or during the time slot to receive a wider bandwidth than specified over a related receive time duration. For example, the bandwidth can be specified based at least in part on a bandwidth for a previous receive time duration, and bandwidth switching component 206 can increase the bandwidth in the time slot to accommodate additional carriers, such that device 102 need not interrupt receiving in a subsequent receive time duration to configure carriers that may be activated during the receive time duration. In one example, bandwidth switching component 206 can configure the receiver to receive wider bandwidth in the time slot where the receive time duration is under a threshold time to lessen power consumption caused by receiving over the additional bandwidth. It is to be appreciated that the receive time duration can be received from base station 104 and/or computed based at least in part on a receive time slot indication and subsequent transmit time slot indication.

Moreover, for example, bandwidth switching component 206 performing bandwidth switching can affect uplink transmissions to base station 104 (e.g., where an activated/deactivated carrier is an uplink carrier, etc.). In this example, resource selecting component 204 can similarly select resources (e.g., subframes) for which no uplink grant is received for instructing bandwidth switching component 206 to perform the bandwidth switching. If no such resources exist, resource selecting component 204 can choose resources where device 102 is not assigned to transmit control information (e.g., layer 1 control information, such as channel quality indicator (CQI), acknowledgement (ACK)/NAK, etc., upper layer control information, and/or the like).

Figure 3:
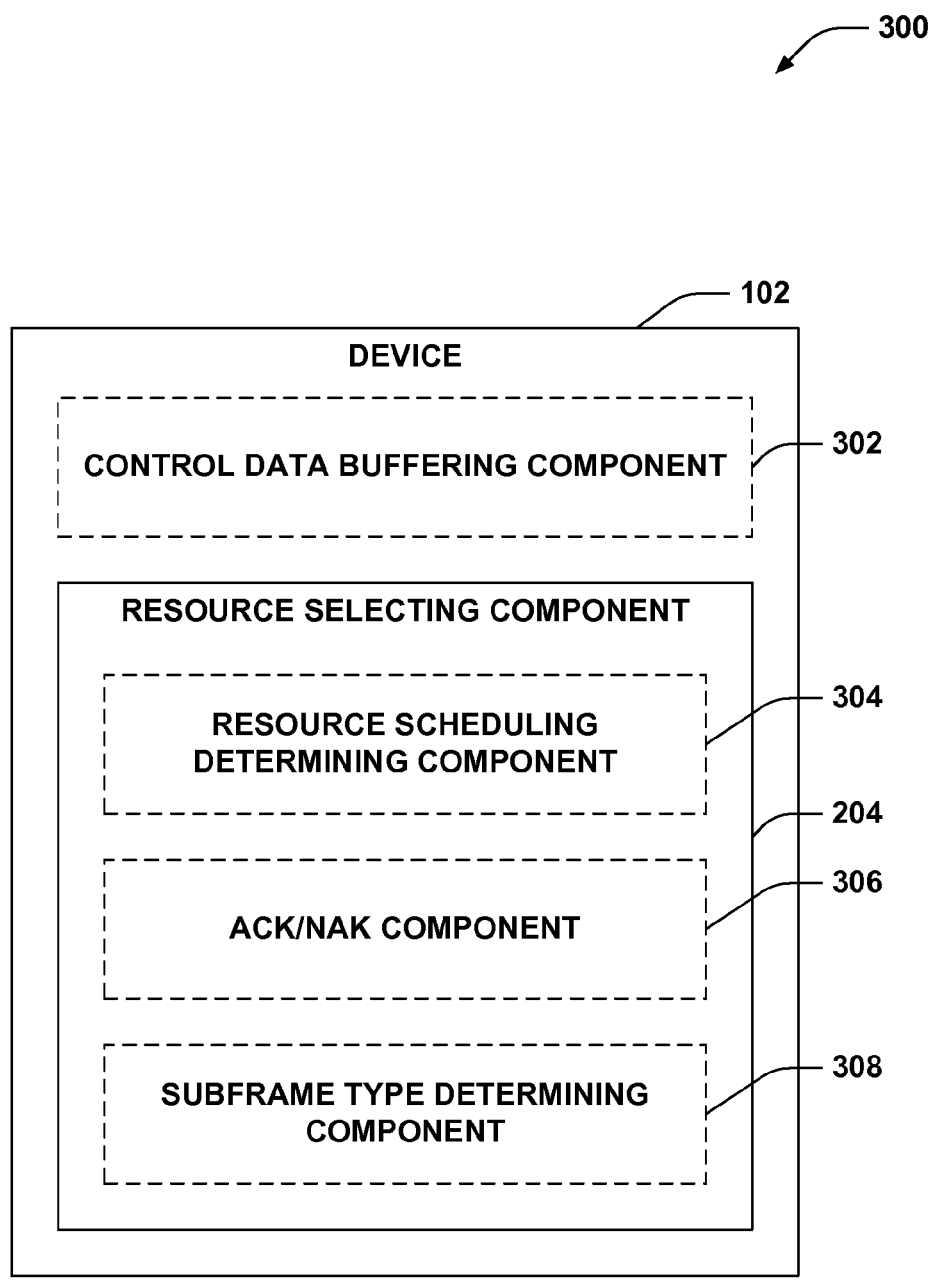
FIG. 3 illustrates an example system that facilitates selecting one or more resources for performing bandwidth switching.

Referring to FIG. 3, illustrated is an example wireless communications system 300 that facilitates selecting resources for performing bandwidth switching. System 300 comprises a device 102, which as described can communicate with one or more base stations over one or more carriers to access a wireless network. In addition, as described, device 102 can activate/deactivate one or more configured carriers (e.g., based on one or more commands from a base station or otherwise), which can cause switch in a bandwidth utilized by device 102 (e.g., to change a sampling rate, reconfigure filters, modify a local oscillator frequency, and/or the like). Device 102 can include a resource selecting component 204, which as described can determine a set of resources (e.g., one or more subframes) for performing bandwidth switching, and optionally a control data buffering component 302 that can obtain a control portion of the one or more subframes while device 102 performs bandwidth switching over a remainder of the one or more subframes.

In an example, resource selecting component 204 can optionally comprise one or more components for determining aspects of the one or more subframes, as described previously. For example, resource selecting component 204 can optionally comprise a resource scheduling determining component 304 that detects whether resources are assigned to device 102 in one or more subframes used or being analyzed for performing bandwidth switching, an ACK/NAK component 306 that reports retransmission feedback for a subframe based at least in part on determining whether resources were assigned to device 102 in the subframe, and/or a subframe type determining component 308 that discerns one or more aspects regarding one or more subframes, or information communicated within the one or more subframes, for determining whether to perform bandwidth switching in the one or more subframes.

According to an example, resource selecting component 204 can determine one or more subframes subsequent to receiving a carrier activation/deactivation command from a base station (not shown), as described, in which to perform bandwidth switching. In an example, control data buffering component 302 can receive and store a control portion of the subframe (e.g., a first n symbols, where n is a positive integer), and device 102 can perform bandwidth switching, as described, during a remainder of the subframe. In this example, resource scheduling determining component 304 can determine whether device 102 was scheduled to receive data in the remainder of the subframe, and if so, ACK/NAK component 306 can transmit a NAK to the base station to cause retransmission of the data. In addition, buffering the control region allows device 102 to receive other critical control data (e.g., such as retransmission requests for uplink resources, etc.), and thus, disruption caused by performing the bandwidth switching is minimized in both cases.

In another example, resource scheduling determining component 304 can detect whether resources are scheduled for device 102 in a subframe (e.g., following receiving an activation and/or deactivation of a carrier) based at least in part on a control portion of the subframe. In this example, resource selecting component 204 can determine whether to perform bandwidth switching in the subframe based at least in part on whether resources are scheduled for device 102 (e.g., and/or based on one or more aspects of such an assignment, such as a size, data type, and/or the like). In one example, resource scheduling determining component 304 can determine whether one or more uplink or downlink grants are received in the one or more subframes. In another example, resource scheduling determining component 304 can discern whether uplink control resources are scheduled in one or more subframes, and device 102 can avoid switching bandwidth for uplink carriers during such subframes.

In yet another example, subframe type determining component 308 can be utilized, as described, to obtain one or more aspects related to the subframe, such as a type thereof, information expected to be communicated within the subframe, and/or the like. Thus, for example, subframe type determining component 308 can receive a type of a subframe, and can determine whether the subframe is MBSFN, as described, whether the MBSFN subframe relates to a service utilized by device 102, and/or the like. Resource selecting component 204, in this example, can determine whether to utilize the subframe for bandwidth switching, as described. Moreover, in an example, subframe type determining component 308 can discern certain subframes for receiving critical information, such as TA, synchronization signals, SIBs, and/or the like. For example, such signals can be sent with a certain periodicity, and thus, subframe type determining component 308 can predict whether a subframe will include such information. If so, resource selecting component 204, as described, can avoid the subframe, and/or utilize a next subframe for bandwidth switching since there is a low likelihood of transmitting the information over consecutive subframes.

Figure 4:
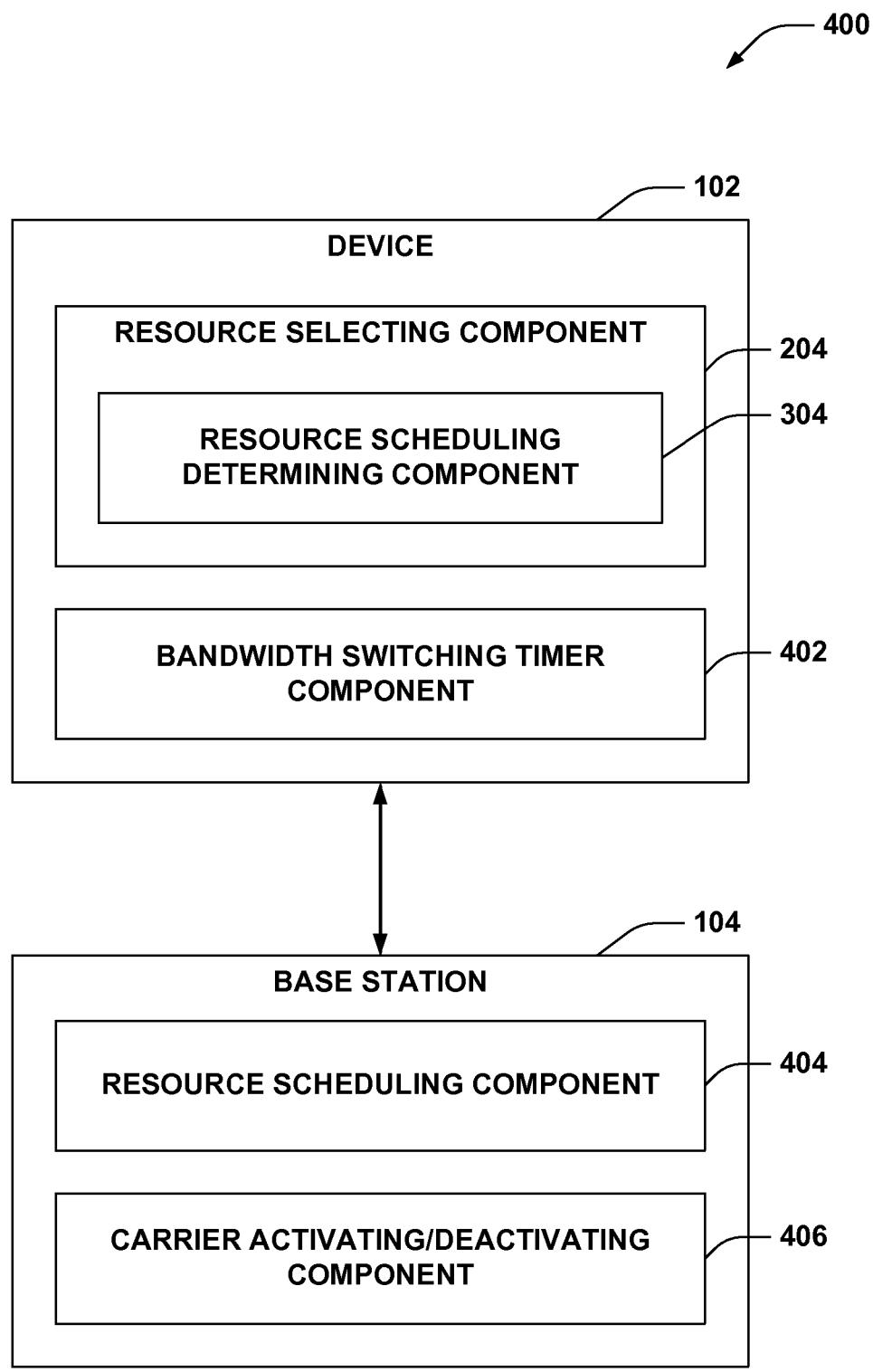
FIG. 4 illustrates an example system that facilitates selecting one or more resources for performing bandwidth switching based on a timer.

Turning to FIG. 4, illustrated is an example wireless communications system 400 that facilitates selecting resources for performing bandwidth switching related to activating and/or deactivating carriers. System 400 comprises a device 102, which as described can communicate with a base station 104 (and/or one or more additional base stations) over a plurality of carriers to receive wireless network access. Device 102 can comprise a resource selecting component 204 that can determine one or more subframes during which to switch bandwidth related to the carrier activation/deactivation, and a bandwidth switching timer component 402 that initializes a timer upon activating and/or deactivating a carrier during which to search for subframes without resource assignments. Additionally, resource selecting component 204 includes a resource scheduling determining component 304 that can determine whether resources are scheduled for device 102 in one or more subframes. Base station 104 can include a resource scheduling component 404 that assigns resources to a device for receiving downlink communications, transmitting uplink communications, and/or the like, and a carrier activating/deactivating component 406 that instructs a device to modify an activation state of one or more configured carriers.

According to an example, carrier activating/deactivating component 406 can indicate to device 102 to activate and/or deactivate one or more configured carriers (e.g., for modifying a data rate based on requested data, and/or the like). In this regard, resource scheduling component 404 can refrain from scheduling resources to device 102 during one or more subsequent subframes to allow device 102 to switch bandwidths according to the carrier activation and/or deactivation. Thus, for example, upon receiving the indication to modify the activation state of the carrier, as described, resource scheduling determining component 304 can determine one or more subsequent subframes which have no resources assigned (e.g., by analyzing control data in the one or more subframes, as described), and device 102 can perform bandwidth switching in the one or more subsequent subframes.

In another example, bandwidth switching timer component 402 can initialize a timer upon receiving the activation/deactivation indication for determining the one or more subframes. This, for example, allows resource selecting component 204 to determine whether base station 104 supports refraining from assigning resources for one or more subframes subsequent to receiving the activation/deactivation indication. If not, the timer can expire before resource scheduling determining component 304 locates one or more subframes without a resource assignment, and the resource selecting component 204 can then select substantially any subframe(s) (e.g., pursuant to other aspects described above or otherwise) for performing the bandwidth switching.

Figure 5:
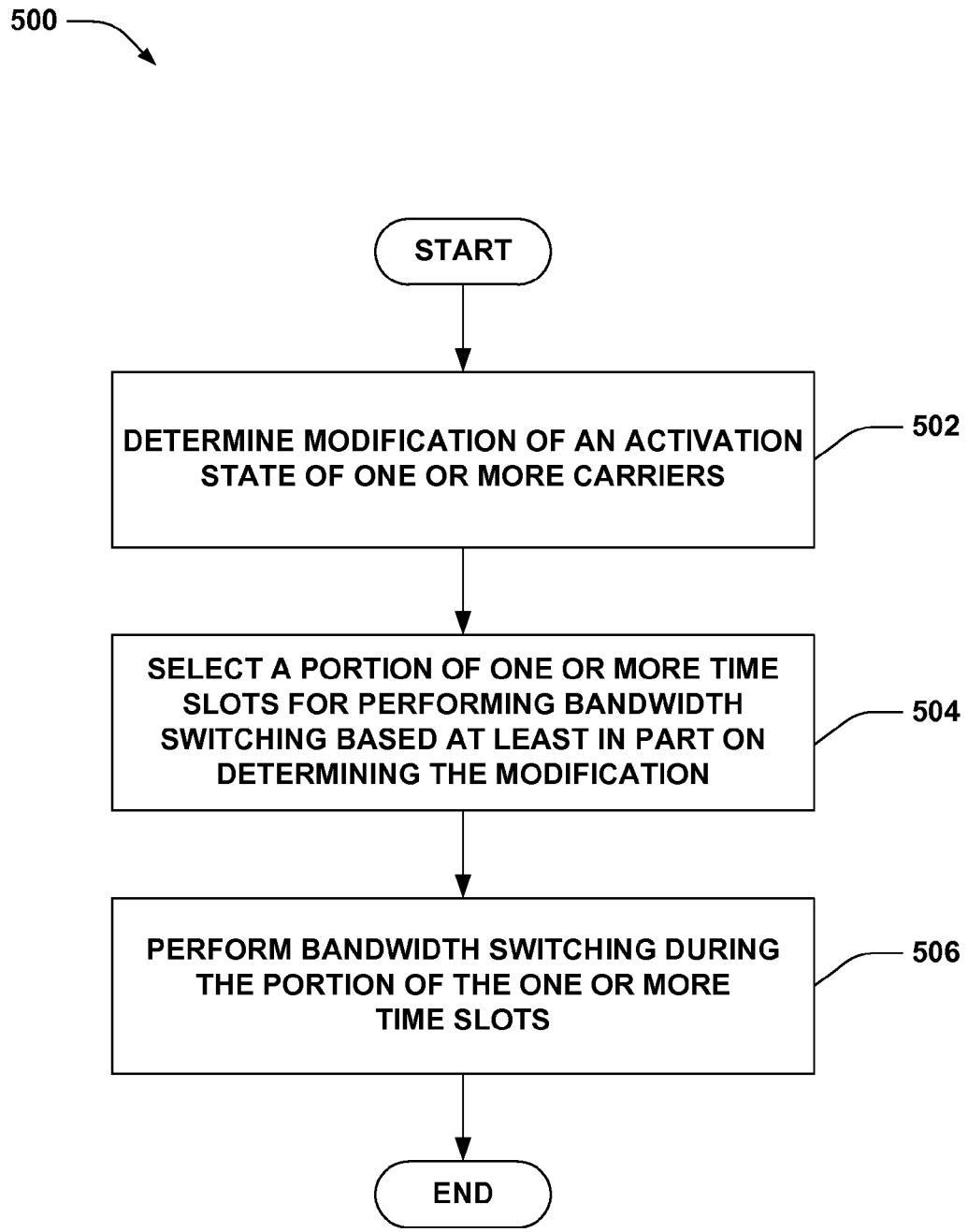
FIG. 5 illustrates an example methodology that facilitates performing bandwidth switching over one or more selected subframes.
Figure 6:
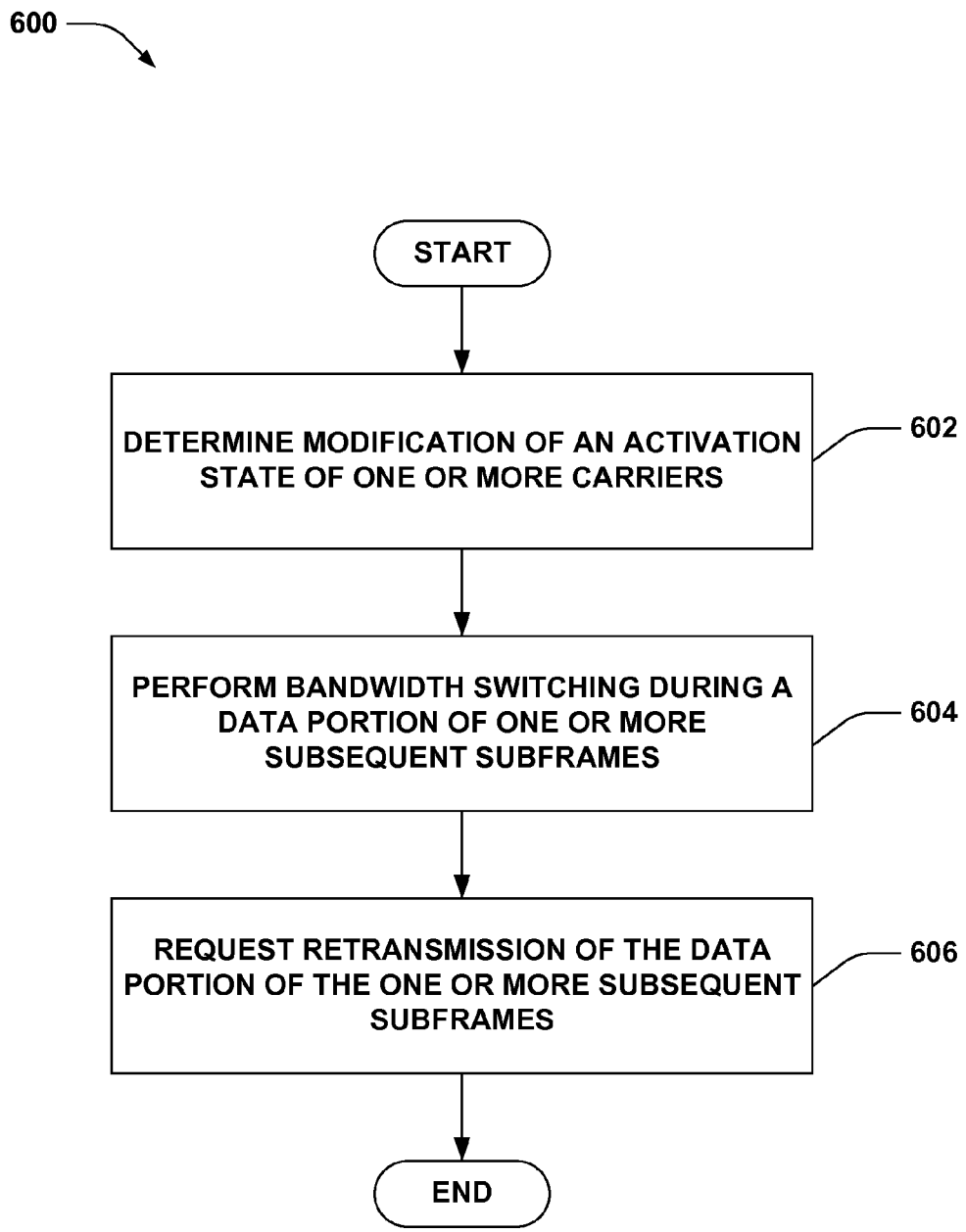
FIG. 6 illustrates an example methodology that requests retransmission of data over subframes during which bandwidth switching is performed.
Figure 7:
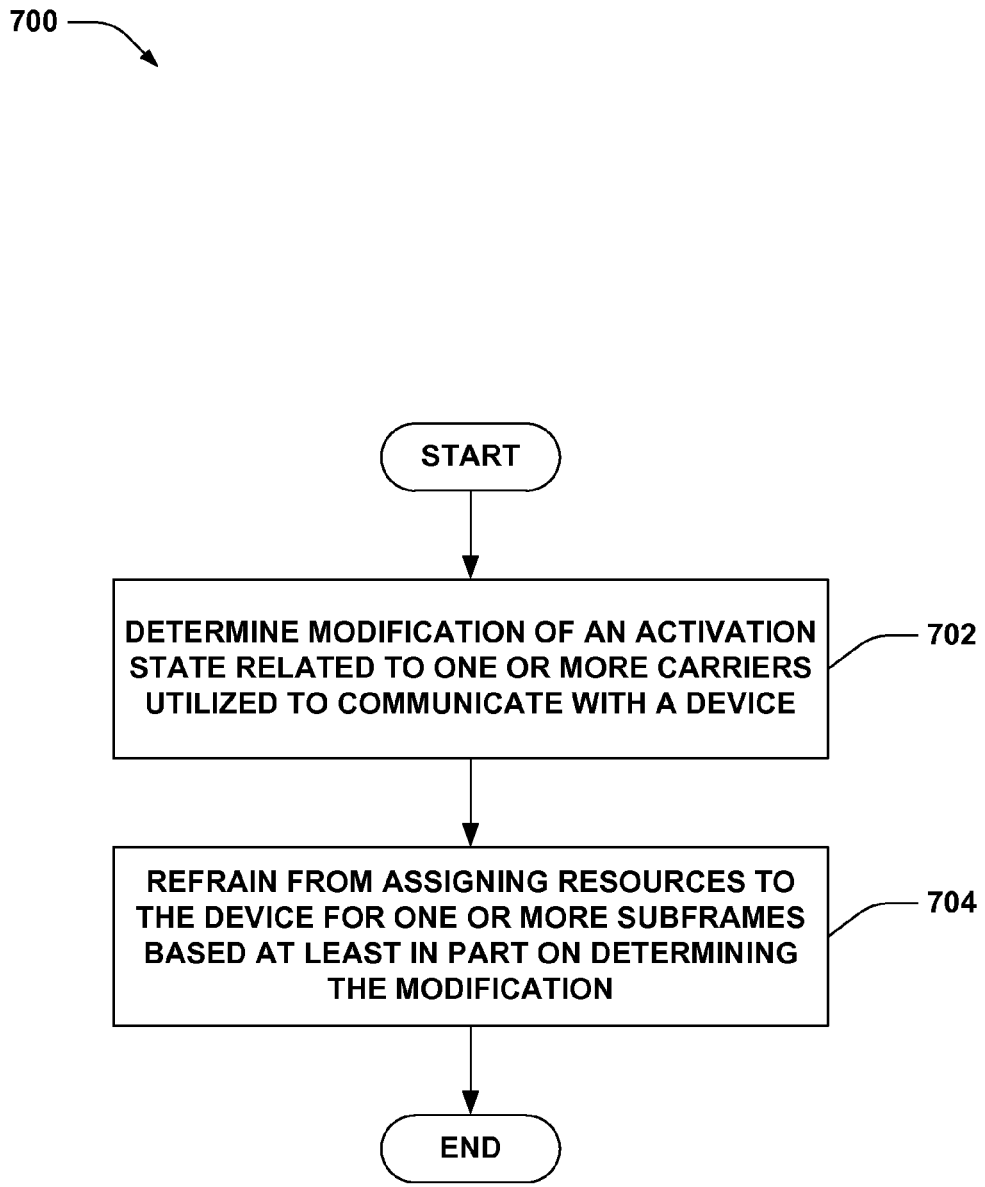
FIG. 7 illustrates an example methodology for refraining from transmitting over one or more subframes to allow a device to perform bandwidth switching.

Referring to FIGS. 5-7, example methodologies relating to performing bandwidth switching for carrier activation and/or deactivation are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Referring to FIG. 5, an example methodology 500 is displayed that facilitates switching bandwidth for carrier activation and/or deactivation. At 502, modification of an activation state of one or more carriers can be determined. As described, for example, this can include receiving a command from a base station to activate and/or deactivate one or more configured carriers. This can result in a change of bandwidth, as described. Thus, at 504, a portion of one or more time slots can be selected for performing bandwidth switching based at least in part on determining the modification. For example, the portion of one or more time slots can be selected as a data portion of one or more subframes to minimize impact to communications with a base station, as described. In one example, this can include selecting one or more subframes which have no uplink or downlink grants (e.g., based on related control data in the one or more subframes).

In another example, the subframes can be selected based on a type of subframe (e.g., MBSFN or otherwise), a type of one or more signals communicated in the subframe (e.g., TA, synchronization signals, SIB, etc.), and/or the like. In addition, the number of the one or more subframes can be determined for performing the bandwidth switching (e.g., where more than one subframe is required). Moreover, in an example, a timer can be initialized upon determining the modification of the activation state, during which the one or more subframes must meet some requirements in order to be selected (such has have no downlink grant). After the timer, one or more subframes can be selected based on other criteria. In addition, the one or more time slots can relate to time slots for powering on a receiver in TDD communications. In any case, at 506, bandwidth switching can be performed during the portion of the one or more time slots. This can include changing a sampling rate, reconfiguring filters to filter in/out some frequencies, modifying a local oscillator, increasing a receive bandwidth of a receiver for TDD communications, and/or the like, as described.

Turning to FIG. 6, an example methodology 600 is displayed that facilitates performing bandwidth switching in one or more subframes. At 602, modification of an activation state of one or more carriers can be determined. As described, for example, this can include receiving a command from a base station to activate and/or deactivate one or more configured carriers, which can result in a change of bandwidth, as described. Thus, at 604, bandwidth switching can be performed during a data portion of one or more subsequent subframes. As described, for example, the one or more subsequent subframes can have a control portion (e.g., the first n symbols), and a data portion. The data portion of the one or more subframes can utilize a retransmission technology, such as HARQ, to ensure transmission of data over related resources. Thus, at 606, retransmission of the data portion of the one or more subsequent subframes can be requested if it is determined that the one or more subframes contain data for the device. This can include, for example, communicating NAK to the base station related to the data portion of the one or more subsequent subframes, causing retransmission thereof.

Referring to FIG. 7, illustrated is an example methodology 700 for allowing a device one or more subframes for performing bandwidth switching. At 702, modification of an activation state related to one or more carriers utilized to communicate with a device can be determined. As described, this can be determined based on one or more related commands communicated to the device. At 704, assigning resources to the device can be refrained from for one or more subframes based at least in part on determining the modification. Thus, as described, the device can determine the one or more subframes without assigned resources for performing the bandwidth switching.

It will be appreciated that, in accordance with one or more aspects described herein, inferences can be made regarding determining one or more subframes during which to perform bandwidth switching, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 8:
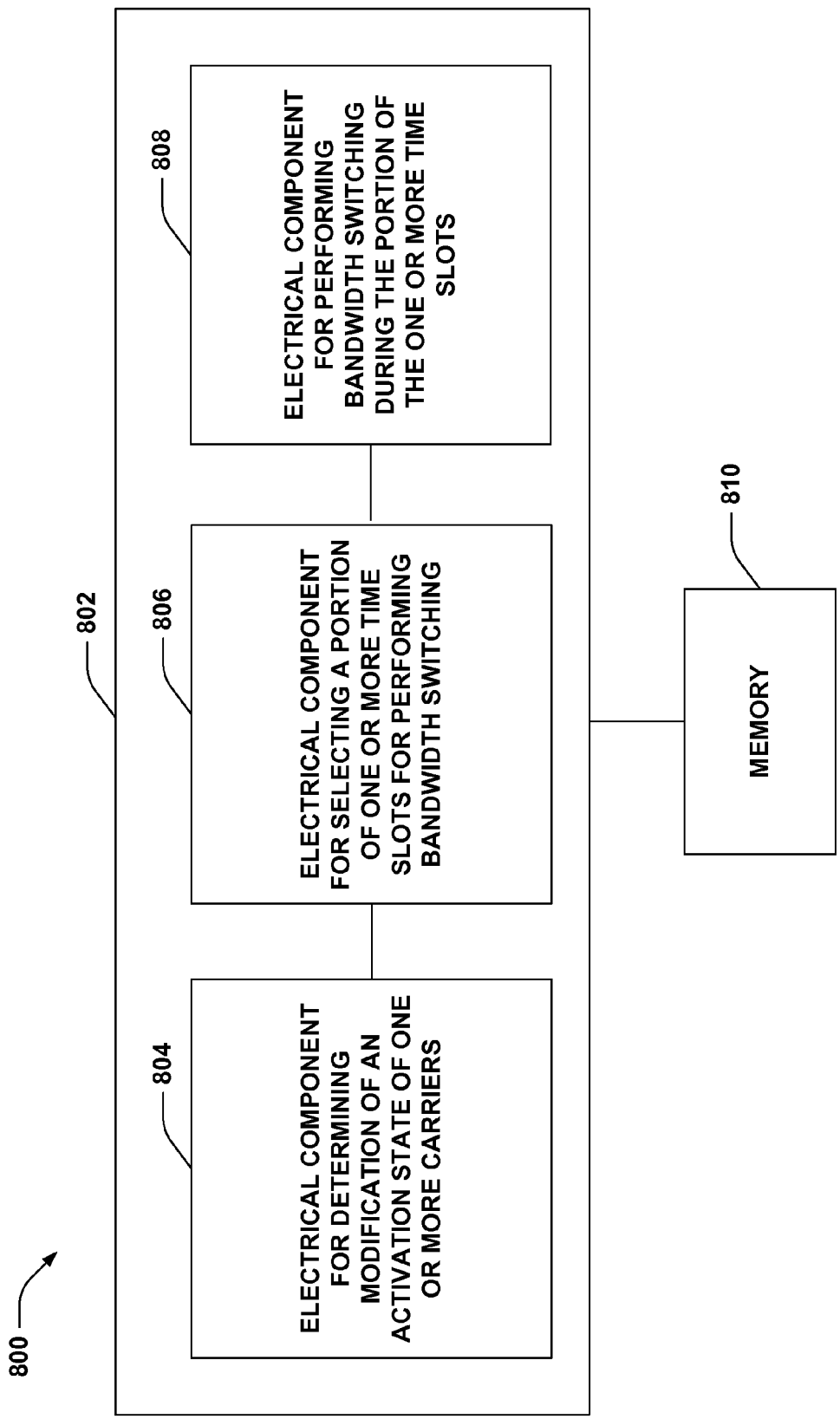
FIG. 8 illustrates an example system for performing bandwidth switching over one or more selected subframes.

With reference to FIG. 8, illustrated is a system 800 that performs bandwidth switching to activate and/or deactivate one or more carriers. For example, system 800 can reside at least partially within a base station, mobile device, etc. It is to be appreciated that system 800 is represented as including functional blocks, which can be functional blocks that represent functions implemented by a processor, software, or combination thereof (e.g., firmware). System 800 includes a logical grouping 802 of electrical components that can act in conjunction. For instance, logical grouping 802 can include an electrical component for determining notification of an activation state of the one or more carriers 804. As described, this can include receiving a command from a base station to activate and/or deactivate one or more configured carriers, which can cause a switch in bandwidth to transmit and/or receive over the newly activated and/or deactivated carriers. Further, logical grouping 802 can comprise an electrical component for selecting a portion of one or more time slots for performing bandwidth switching 806.

As described, for example, this can be performed in response to determining modification of the activation state. In one example, the time slots can correspond to one or more subframes, and electrical component 806 can select the portion of the one or more subframes as described above, such as based at least in part on whether a grant is received in the one or more subframes, a type of the subframes, a type of signals transmitted in the subframe, and/or the like. In addition, electrical component 806 can select a number of subframes to utilize for performing the bandwidth switching. Also, however, the time slots can correspond to a time slot related to powering on a receiver in TDD communications. Moreover, logical grouping 802 can include an electrical component for performing bandwidth switching during the portion of the one or more time slots 808. As described, electrical component 808 can perform the bandwidth switching by changing a sampling rate, reconfiguring filters to filter in/out some frequencies, modifying a local oscillator, increase a receive bandwidth, and/or the like. Additionally, system 800 can include a memory 810 that retains instructions for executing functions associated with the electrical components 804, 806, and 808. While shown as being external to memory 810, it is to be understood that one or more of the electrical components 804, 806, and 808 can exist within memory 810.

Figure 9:
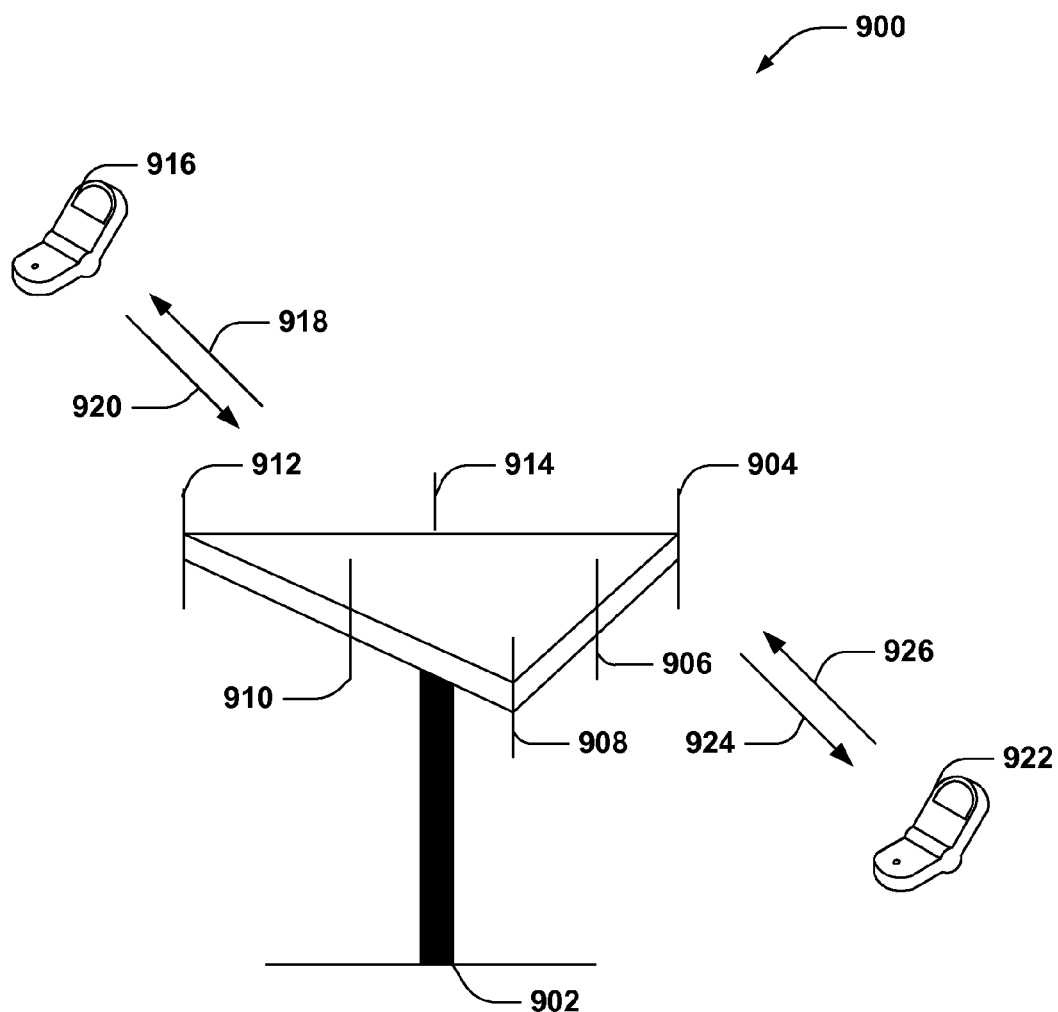
FIG. 9 illustrates a wireless communication system in accordance with various aspects set forth herein.

Referring now to FIG. 9, a wireless communication system 900 is illustrated in accordance with various embodiments presented herein. System 900 comprises a base station 902 that can include multiple antenna groups. For example, one antenna group can include antennas 904 and 906, another group can comprise antennas 908 and 910, and an additional group can include antennas 912 and 914. Two antennas are illustrated for each antenna group; however, more or fewer antennas can be utilized for each group. Base station 902 can additionally include a transmitter chain and a receiver chain, each of which can in turn comprise a plurality of components associated with signal transmission and reception (e.g., processors, modulators, multiplexers, demodulators, demultiplexers, antennas, etc.), as is appreciated.

Base station 902 can communicate with one or more mobile devices such as mobile device 916 and mobile device 922; however, it is to be appreciated that base station 902 can communicate with substantially any number of mobile devices similar to mobile devices 916 and 922. Mobile devices 916 and 922 can be, for example, cellular phones, smart phones, laptops, handheld communication devices, handheld computing devices, satellite radios, global positioning systems, PDAs, and/or any other suitable device for communicating over wireless communication system 900. As depicted, mobile device 916 is in communication with antennas 912 and 914, where antennas 912 and 914 transmit information to mobile device 916 over a forward link 918 and receive information from mobile device 916 over a reverse link 920. Moreover, mobile device 922 is in communication with antennas 904 and 906, where antennas 904 and 906 transmit information to mobile device 922 over a forward link 924 and receive information from mobile device 922 over a reverse link 926. In a frequency division duplex (FDD) system, forward link 918 can utilize a different frequency band than that used by reverse link 920, and forward link 924 can employ a different frequency band than that employed by reverse link 926, for example. Further, in a time division duplex (TDD) system, forward link 918 and reverse link 920 can utilize a common frequency band and forward link 924 and reverse link 926 can utilize a common frequency band.

Each group of antennas and/or the area in which they are designated to communicate can be referred to as a sector of base station 902. For example, antenna groups can be designed to communicate to mobile devices in a sector of the areas covered by base station 902. In communication over forward links 918 and 924, the transmitting antennas of base station 902 can utilize beamforming to improve signal-to-noise ratio of forward links 918 and 924 for mobile devices 916 and 922. Also, while base station 902 utilizes beamforming to transmit to mobile devices 916 and 922 scattered randomly through an associated coverage, mobile devices in neighboring cells can be subject to less interference as compared to a base station transmitting through a single antenna to all its mobile devices. Moreover, mobile devices 916 and 922 can communicate directly with one another using a peer-to-peer or ad hoc technology as depicted. According to an example, system 900 can be a multiple-input multiple-output (MIMO) communication system.

Figure 10:
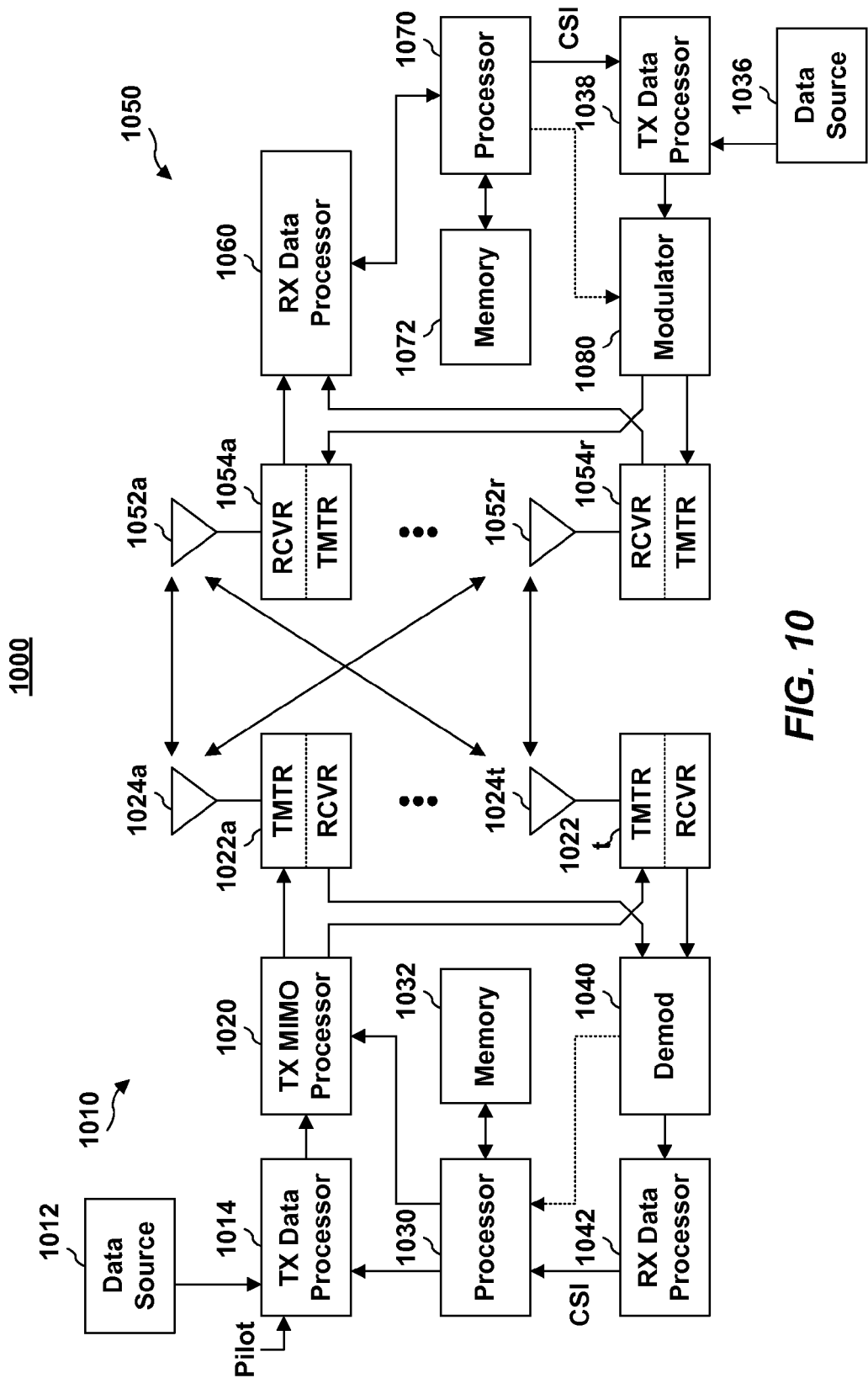
FIG. 10 illustrates an example wireless network environment that can be employed in conjunction with the various systems and methods described herein.

FIG. 10 shows an example wireless communication system 1000. The wireless communication system 1000 depicts one base station 1010 and one mobile device 1050 for sake of brevity. However, it is to be appreciated that system 1000 can include more than one base station and/or more than one mobile device, wherein additional base stations and/or mobile devices can be substantially similar or different from example base station 1010 and mobile device 1050 described below. In addition, it is to be appreciated that base station 1010 and/or mobile device 1050 can employ the systems (FIGS. 1-4 and 8-9) and/or methods (FIGS. 5-7) described herein to facilitate wireless communication there between. In this regard, for example, components or functions of the systems and/or methods described herein can be part of a memory 1032 and/or 1072 or processors 1030 and/or 1070 described below, and/or can be executed by processors 1030 and/or 1070 to perform the disclosed functions.

At base station 1010, traffic data for a number of data streams is provided from a data source 1012 to a transmit (TX) data processor 1014. According to an example, each data stream can be transmitted over a respective antenna. TX data processor 1014 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1050 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1030.

The modulation symbols for the data streams can be provided to a TX MIMO processor 1020, which can further process the modulation symbols (e.g., for OFDM). TX MIMO processor 1020 then provides $N_T$ modulation symbol streams to $N_T$ transmitters (TMTR) 1022a through 1022t. In various embodiments, TX MIMO processor 1020 applies beamforming weights to the symbols of the data streams and to the antenna from which the symbol is being transmitted.

Each transmitter 1022 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1022a through 1022t are transmitted from $N_T$ antennas 1024a through 1024t, respectively.

At mobile device 1050, the transmitted modulated signals are received by $N_R$ antennas 1052a through 1052r and the received signal from each antenna 1052 is provided to a respective receiver (RCVR) 1054a through 1054r. Each receiver 1054 conditions (e.g., filters, amplifies, and downconverts) a respective signal, digitizes the conditioned signal to provide samples, and further processes the samples to provide a corresponding "received" symbol stream.

An RX data processor 1060 can receive and process the $N_R$ received symbol streams from $N_R$ receivers 1054 based on a particular receiver processing technique to provide $N_T$ "detected" symbol streams. RX data processor 1060 can demodulate, deinterleave, and decode each detected symbol stream to recover the traffic data for the data stream. The processing by RX data processor 1060 is complementary to that performed by TX MIMO processor 1020 and TX data processor 1014 at base station 1010.

A processor 1070 can periodically determine which precoding matrix to utilize as discussed above. Further, processor 1070 can formulate a reverse link message comprising a matrix index portion and a rank value portion.

The reverse link message can comprise various types of information regarding the communication link and/or the received data stream. The reverse link message can be processed by a TX data processor 1038, which also receives traffic data for a number of data streams from a data source 1036, modulated by a modulator 1080, conditioned by transmitters 1054a through 1054r, and transmitted back to base station 1010.

At base station 1010, the modulated signals from mobile device 1050 are received by antennas 1024, conditioned by receivers 1022, demodulated by a demodulator 1040, and processed by a RX data processor 1042 to extract the reverse link message transmitted by mobile device 1050. Further, processor 1030 can process the extracted message to determine which precoding matrix to use for determining the beamforming weights.

Processors 1030 and 1070 can direct (e.g., control, coordinate, manage, etc.) operation at base station 1010 and mobile device 1050, respectively. Respective processors 1030 and 1070 can be associated with memory 1032 and 1072 that store program codes and data. Processors 1030 and 1070 can also perform computations to derive frequency and impulse response estimates for the uplink and downlink, respectively.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of wireless communication, comprising:
   determining modification of an activation state of one or more carriers;
   initializing a timer upon the determining modification of the activation state;
   selecting, following expiration of the timer, a portion of one or more time slots for performing bandwidth switching based at least in part on the determining of the modification and on one or more types and/or purposes of the one or more time slots; and
   performing bandwidth switching during the portion of the one or more time slots.

2. The method of claim 1, wherein the selecting of the portion of the one or more time slots comprises selecting one or more subframes.

3. The method of claim 2, wherein the selecting of the portion of the one or more subframes comprises selecting the portion corresponding to a data portion of the one or more subframes.

4. The method of claim 3, further comprising receiving an indication of a portion of one or more data symbols within a given subframe to utilize for bandwidth switching from a base station, wherein the selecting of the portion of the one or more subframes further comprises selecting the data portion based at least in part on the indication of the portion of the one or more data symbols.

5. The method of claim 3, further comprising:
   determining a subframe for which no downlink grant is received before expiration of the timer, wherein the selecting of the portion of the one or more subframes comprises selecting the portion from the subframe for which no downlink grant is received.

6. The method of claim 2, further comprising determining a number of consecutive subframes for performing bandwidth switching, wherein the selecting of the portion of the one or more subframes comprises selecting the portion of the one or more subframes to correspond to at least the number of consecutive subframes.

7. The method of claim 2, further comprising requesting retransmission of data related to the one or more subframes based at least in part on control data in the one or more subframes.

8. The method of claim 2, further comprising determining control data in the one or more subframes, wherein the selecting of the portion of the one or more subframes is based at least in part on the control data.

9. The method of claim 2, further comprising determining that the one or more subframes comprise at least one multimedia broadcast over single frequency network (MBSFN) subframe, wherein the selecting of the portion of the one or more subframes is based at least in part on determining that the one or more subframes comprise the at least one MBSFN subframe.

10. The method of claim 2, further comprising determining that one or more types of signals are not transmitted in the one or more subframes, wherein the selecting of the portion of the one or more subframes is based at least in part on determining that the one or more types of signals are not transmitted in the one or more subframes.

11. The method of claim 10, wherein the one or more types of signals relate to at least one of timing advance commands, synchronization signals, or system information blocks.

12. The method of claim 2, further comprising determining whether to transmit control data in the one or more subframes, wherein the selecting of the portion of the one or more subframes is based at least in part on determining not to transmit control data in the one or more subframes.

13. The method of claim 2, wherein the performing bandwidth switching comprises at least one of changing a sampling rate, reconfiguring frequency filters, or retuning a local oscillator to a different frequency.

14. The method of claim 1, further comprising determining that the one or more time slots correspond to a time slot for powering on a receiver in time division duplexed communications, wherein the selecting the one or more time slots is based at least in part on the determining that the one or more time slots correspond to the time slot for powering on the receiver.

15. An apparatus for activating or deactivating configured carriers in wireless communications, comprising:
   at least one processor configured to:
      detect modification of an activation state of one or more carriers;
      initialize a timer upon the determining modification of the activation state;
      select, following expiration of the timer, a portion of one or more time slots for performing bandwidth switching based at least in part on the modification of the activation state and on one or more types and/or purposes of the one or more time slots; and
      switch bandwidth during the portion of the one or more time slots; and
   a memory coupled to the at least one processor.

16. The apparatus of claim 15, wherein the one or more time slots correspond to one or more subframes.

17. The apparatus of claim 16, wherein the portion of the one or more subframes is a data portion of the one or more subframes.

18. The apparatus of claim 17, wherein the at least one processor is further configured to receive an indication of a portion of one or more data symbols in a given subframe to utilize for bandwidth switching from a base station, and the at least one processor selects the portion of the one or more subframes based at least in part on the portion of the one or more data symbols.

19. The apparatus of claim 16, wherein the at least one processor is further configured to determine a number of consecutive subframes for switching bandwidth, and the at least one processor selects the portion of the one or more subframes according to the number of consecutive subframes.

20. The apparatus of claim 16, wherein the at least one processor is further configured to request retransmission of data related to the one or more subframes based at least in part on control data in the one or more subframes.

21. The apparatus of claim 16, wherein the at least one processor is further configured to determine control data in the one or more subframes, and the at least one processor selects the portion of the one or more subframes based at least in part on the control data.

22. The apparatus of claim 16, wherein the at least one processor is further configured to determine that the one or more subframes are multimedia broadcast over single frequency network (MBSFN), and the at least one processor selects the portion of the one or more subframes based at least in part on determining the one or more subframes are MBSFN.

23. The apparatus of claim 16, wherein the at least one processor is further configured to determine that one or more types of signals are not transmitted in the one or more subframes, wherein the at least one processor selects the portion of the one or more subframes based at least in part on determining that the one or more types of signals are not transmitted in the one or more subframes.

24. The apparatus of claim 16, wherein the at least one processor is further configured to determine whether to transmit control data in the one or more subframes, wherein the at least one processor selects the portion of the one or more subframes based at least in part on determining not to transmit control data in the one or more subframes.

25. The apparatus of claim 16, wherein the at least one processor switches bandwidth at least in part by changing a sampling rate, reconfiguring frequency filters, or retuning a local oscillator to a different frequency.

26. The apparatus of claim 15, wherein the at least one processor is further configured to determine that the one or more time slots correspond to a time slot for powering on a receiver in time division duplexed communications, and the at least one processor selects the portion of the one or more time slots based at least in part on determining the one or more time slots correspond to the time slot for powering on the receiver.

27. An apparatus for activating or deactivating configured carriers, comprising:
means for determining modification of an activation state of one or more carriers;
means for initializing a timer upon the determining modification of the activation state;
means for selecting, following expiration of the timer, a portion of one or more time slots for performing bandwidth switching based at least in part on the determining the modification and on one or more types and/or purposes of the one or more time slots; and
means for performing bandwidth switching during the portion of the one or more time slots.

28. The apparatus of claim 27, wherein the one or more time slots correspond to one or more subframes.

29. The apparatus of claim 28, wherein the portion of the one or more subframes corresponds to a data portion of the one or more subframes.

30. The apparatus of claim 29, wherein the means for selecting is further for receiving an indication of a portion of one or more data symbols in a given subframe to utilize for bandwidth switching, and for selecting the portion of the one or more subframes based at least in part on the indication of the portion of one or more data symbols.

31. The apparatus of claim 28, wherein the means for selecting is further for determining a number of consecutive subframes for performing bandwidth switching, and for selecting the portion of the one or more subframes to correspond to at least the number of consecutive subframes.

32. The apparatus of claim 28, further comprising means for requesting retransmission of data related to the one or more subframes based at least in part on control data in the one or more subframes.

33. The apparatus of claim 28, further comprising means for determining control data in the one or more subframes, wherein the means for selecting is for selecting the portion of the one or more subframes based at least in part on the control data.

34. The apparatus of claim 28, further comprising means for determining that the one or more subframes are multimedia broadcast over single frequency network (MBSFN), wherein the means for selecting is for selecting the portion of the one or more subframes based at least in part on the means for determining the one or more subframes are MBSFN.

35. The apparatus of claim 28, further comprising means for determining that one or more types of signals are not transmitted in the one or more subframes, wherein the means for selecting is for selecting the portion of the one or more subframes based at least in part on the means for determining that the one or more types of signals are not transmitted in the one or more subframes.

36. The apparatus of claim 28, further comprising means for determining whether to transmit control data in the one or more subframes, wherein the means for selecting is for selecting the portion of the one or more subframes based at least in part on the means for determining not to transmit control data in the one or more subframes.

37. The apparatus of claim 28, wherein the means for performing is for performing bandwidth switching at least in part by changing a sampling rate, reconfiguring frequency filters, or retuning a local oscillator to a different frequency.

38. The apparatus of claim 27, wherein the means for selecting is further for determining that the one or more subframes correspond to a time slot for powering on a receiver in time division duplexed communications, and is for selecting the portion of the one or more time slots based at least in part on determining the one or more time slots correspond to the time slot for powering on the receiver.

39. A computer program product for activating or deactivating configured carriers in wireless communications, comprising:
a non-transitory computer-readable medium, comprising:
code for causing at least one computer to detect modification of an activation state of one or more carriers;
code for causing at least one computer to initialize a timer upon detecting modification of the activation state;
code for causing the at least one computer to select, following expiration of the timer, a portion of one or more time slots for performing bandwidth switching based at least in part on the modification of the activation state and on one or more types and/or purposes of the one or more time slots; and
code for causing the at least one computer to switch bandwidth during the portion of the one or more time slots.

40. An apparatus for activating or deactivating configured carriers, comprising:
a carrier modification receiving component configured to determine modification of an activation state of one or more carriers;
a bandwidth switching timer component configured to initialize a timer upon determining modification of the activation state;
a resource selecting component configured to select, following expiration of the timer, a portion of one or more time slots for performing bandwidth switching based at least in part on the determining the modification and on one or more types and/or purposes of the one or more time slots; and
a bandwidth switching component configured to perform bandwidth switching during the portion of the one or more time slots, wherein at least one of the carrier modification receiving component, the resource selecting component, and the bandwidth switching component comprises hardware.

41. The apparatus of claim 40, wherein the one or more time slots correspond to one or more subframes.

42. The apparatus of claim 41, wherein the portion of the one or more subframes corresponds to a data portion of the one or more subframes.

43. The apparatus of claim 42, wherein the resource selecting component is further configured to receive an indication of a portion of one or more data symbols in a given subframe to utilize for bandwidth switching, and to select the portion of the one or more subframes based at least in part on the indication of the portion of the one or more data symbols.

44. The apparatus of claim 41, wherein the resource selecting component is further configured to determine a number of consecutive subframes for performing bandwidth switching, and to select the portion of the one or more subframes to correspond to at least the number of consecutive subframes.

45. The apparatus of claim 41, further comprising an acknowledgement/nonacknowledgement component configured to request retransmission of data related to the one or more subframes based at least in part on control data in the one or more subframes.

46. The apparatus of claim 41, further comprising a control data buffering component configured to determine control data in the one or more subframes, wherein the resource selecting component is configured to select the portion of the one or more subframes based at least in part on the control data.

47. The apparatus of claim 41, further comprising a subframe type determining component configured to determine that the one or more subframes are multimedia broadcast over single frequency network (MBSFN), wherein the resource selecting component is configured to select the portion of the one or more subframes based at least in part on the subframe type determining component determining the one or more subframes are MBSFN.

48. The apparatus of claim 41, further comprising a subframe type determining component configured to determine that one or more types of signals are not transmitted in the one or more subframes, wherein the resource selecting component is configured to select the portion of the one or more subframes based at least in part on the subframe type determining component determining that the one or more types of signals are not transmitted in the one or more subframes.

49. The apparatus of claim 41, further comprising a resource scheduling determining component configured to determine whether to transmit control data in the one or more subframes, wherein the resource selecting component is configured to select the portion of the one or more subframes based at least in part on the resource scheduling determining component determining not to transmit control data in the one or more subframes.

50. The apparatus of claim 41, wherein the bandwidth switching component is configured to perform bandwidth switching at least in part by changing a sampling rate, reconfiguring frequency filters, or retuning a local oscillator to a different frequency.

51. The apparatus of claim 40, wherein the resource selecting component is configured to determine that the one or more subframes correspond to a time slot for powering on a receiver in time division duplexed communications, and to select the portion of the one or more time slots based at least in part on determining the one or more time slots correspond to the time slot for powering on the receiver.

\* \* \* \* \*